US009610881B2

(12) United States Patent
Williams

(10) Patent No.: US 9,610,881 B2
(45) Date of Patent: Apr. 4, 2017

(54) LATCH SYSTEM

(71) Applicant: Currentwrx LLC, St. George, UT (US)

(72) Inventor: Patrick G. Williams, New Harmony, UT (US)

(73) Assignee: CURRENTWRX LLC, St. George, UT (US)

( * ) Notice: Subject to any disclaimer, the term of this patent is extended or adjusted under 35 U.S.C. 154(b) by 0 days.

(21) Appl. No.: 14/962,568

(22) Filed: Dec. 8, 2015

(65) Prior Publication Data

US 2016/0090016 A1    Mar. 31, 2016

Related U.S. Application Data

(63) Continuation of application No. 14/461,522, filed on Aug. 18, 2014, now Pat. No. 9,227,547.

(60) Provisional application No. 61/867,432, filed on Aug. 19, 2013.

(51) Int. Cl.
| | |
|---|---|
| *B60P 3/34* | (2006.01) |
| *B60P 1/43* | (2006.01) |
| *B60P 1/64* | (2006.01) |
| *F16B 7/10* | (2006.01) |

(52) U.S. Cl.
CPC ............... B60P 1/433 (2013.01); B60P 1/435 (2013.01); B60P 1/6427 (2013.01); F16B 7/105 (2013.01); *Y10T 403/32475* (2015.01); *Y10T 403/32483* (2015.01)

(58) Field of Classification Search
CPC ..... B67B 7/38; A01D 85/005; A44B 11/2511; E05B 65/1006; E05D 11/1007; H03K 19/17748; H03K 19/1776; H03K 19/17776; E05C 1/10; B60P 7/13
USPC ....................................................... 296/26.09
See application file for complete search history.

(56) References Cited

U.S. PATENT DOCUMENTS

| | | | | |
|---|---|---|---|---|
| 5,938,262 | A * | 8/1999 | Mills .................... | B60P 3/40 296/26.09 |
| 6,024,528 | A * | 2/2000 | Taylor ................... | A61G 1/06 296/20 |
| 6,065,792 | A * | 5/2000 | Sciullo .................. | B60P 1/003 296/26.09 |
| 6,120,075 | A * | 9/2000 | Terry .................... | B60P 1/003 224/403 |
| 6,390,525 | B2 * | 5/2002 | Carpenter .............. | B61F 5/28 295/39 |
| 6,398,283 | B1 * | 6/2002 | Knudtson .............. | G01N 35/00 294/100 |

(Continued)

*Primary Examiner* — Kiran B Patel
(74) *Attorney, Agent, or Firm* — Brian Parke

(57) ABSTRACT

A slidable conveying assembly may include a latch frame and a latch rod rotatably engaged with, and extending at least partially through the latch frame. The latch rod may include a latch paddle at a first end. The assembly may also include a notch frame configured to slidably engage with the latch frame and a notched bar that may extend at least partially through the front notch frame and that may include multiple notches. The assembly may also include a biasing mechanism operably coupled to the latch frame and the latch rod and configured to bias the latch paddle into the multiple notches such that the latch paddle is biased into removable engagement with the multiple notches as the latch frame slides along the notch frame.

13 Claims, 9 Drawing Sheets

(56) References Cited

U.S. PATENT DOCUMENTS

| | | | | |
|---|---|---|---|---|
| 6,464,274 B2* | 10/2002 | Mink | B60P 1/003 | 296/26.09 |
| 6,659,524 B1* | 12/2003 | Carlson | B60P 1/003 | 296/26.09 |
| 6,834,902 B2* | 12/2004 | Agan | B60P 3/40 | 224/405 |
| 6,860,536 B1* | 3/2005 | Schimunek | B60P 1/003 | 296/26.09 |
| 6,921,120 B1* | 7/2005 | Ervin | B60P 3/40 | 296/26.02 |
| 7,111,887 B2* | 9/2006 | Cooley | B60P 3/14 | 296/26.09 |
| 7,121,603 B2* | 10/2006 | Stevenson | B60P 1/003 | 296/26.09 |
| 7,159,917 B2* | 1/2007 | Haaberg | B60P 3/14 | 224/403 |
| 7,178,823 B1* | 2/2007 | Tai | B60D 1/00 | 280/656 |
| 7,237,817 B2* | 7/2007 | Kobylski | B60P 1/003 | 296/26.01 |
| 7,338,104 B1* | 3/2008 | Bejin | B60P 1/003 | 224/403 |
| 7,445,263 B1* | 11/2008 | Bluhm | B60P 1/003 | 296/26.09 |
| 7,543,872 B1* | 6/2009 | Burns | B60P 1/003 | 296/26.08 |
| 7,543,873 B1* | 6/2009 | Thornsberry | B60P 1/003 | 224/403 |
| 7,976,264 B1* | 7/2011 | Pope | B60P 1/431 | 14/69.5 |
| 8,083,279 B1* | 12/2011 | Kullberg | B62D 33/0273 | 296/26.08 |
| 8,240,527 B1* | 8/2012 | Casselton | B60R 9/065 | 224/281 |
| 8,328,263 B1* | 12/2012 | Alexander | B60R 5/041 | 296/26.09 |
| 8,757,458 B2* | 6/2014 | Nebel | B60R 9/00 | 224/403 |
| 2002/0180231 A1* | 12/2002 | Fox | B62D 33/0273 | 296/26.01 |
| 2004/0007889 A1* | 1/2004 | Hebert | B60P 1/003 | 296/26.09 |
| 2007/0210599 A1* | 9/2007 | Arnold | B60P 1/003 | 296/26.09 |
| 2008/0136206 A1* | 6/2008 | McKelvey | B60P 1/003 | 296/26.09 |
| 2008/0157555 A1* | 7/2008 | Steele | B60P 7/13 | 296/26.09 |
| 2009/0096237 A1* | 4/2009 | Gagliano | B60P 1/003 | 296/26.1 |
| 2009/0284036 A1* | 11/2009 | Clayton | B60P 3/40 | 296/26.09 |
| 2009/0309380 A1* | 12/2009 | Stackpole | B60P 3/40 | 296/26.09 |
| 2010/0283279 A1* | 11/2010 | Suzuki | B60R 5/041 | 296/26.09 |
| 2010/0308613 A1* | 12/2010 | Edwards | B60P 3/07 | 296/26.09 |
| 2013/0341949 A1* | 12/2013 | Bernthisel | B62D 33/0273 | 296/26.09 |

* cited by examiner

LATCH SYSTEM

CROSS-REFERENCE TO RELATED APPLICATIONS

This application is a continuation of U.S. patent application Ser. No. 14/461,522, filed on Aug. 18, 2014, which claims the benefit to U.S. Provisional Application No. 61/867,432, filed on Aug. 19, 2013, all of which are incorporated herein by reference in their entireties.

FIELD

The embodiments discussed herein are related to latch systems.

BACKGROUND

The installation of a slidable or extendible cargo deck conveying assembly to the beds of vehicles such as pickup trucks has been common practice to facilitate the loading and unloading of freight articles on and off the bed of the vehicles. A typical slidable cargo deck conveying assembly includes a cargo deck, configured to fit within a truck bed, which slidably engages with a sliding or rolling mechanism that may be fixedly or slidably coupled to the truck bed. The cargo deck is adapted to transition in a longitudinal direction relative to the truck bed, such that the deck may be extended from or retracted into the truck bed. When extended from the truck bed, fuller access is provided to the cargo deck from multiple sides, a marked improvement over the limited access to the truck bed provided by most pickup trucks.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

An example embodiment may include a latch frame, a latch rod, a notch frame, a notched bar, and a biasing mechanism. The latch frame may include a front latch frame member, a rear latch frame member, a first latch side rail, and a second latch side rail. The latch rod may include a latch paddle at a first end that is configured to rotatably engage with, and extend at least partially between, the front latch frame member and the rear latch frame member. The notch frame may include a front notch frame member, a rear notch frame member, a first notch side rail, and a second notch side rail. The first and second latch side rails may be configured to slidably engage with the first and second notch side rails, respectively, such that the latch frame may slide with respect to the notch frame. The notched bar may extend at least partially between the front notch frame member and the rear notch frame member. The notched bar may include a first end, a second end, a length extending between the first and second ends, and multiple notches disposed along the length of the notched bar. The multiple notches may be configured to removably receive the latch paddle. The biasing mechanism may operably couple to the latch frame and the latch rod and may be configured to bias the latch paddle into the multiple notches such that the latch paddle is biased into removable engagement with the multiple notches as the latch frame slides along the notch frame.

Another example embodiment may include a latch frame, a latch rod, a notch frame, and a notched bar. The latch frame may include a front latch frame member, a rear latch frame member, a first latch side rail, and a second latch side rail. The latch rod may include a latch paddle at a first end. The latch rod may be configured to rotatably engage with and extend at least partially between the front latch frame member and the rear latch frame member. The notch frame may include a front notch frame member, a rear notch frame member, a first notch side rail, and a second notch side rail. The first and second latch side rails may be configured to slidably engage with the first and second notch side rails, respectively, such that the latch frame may slide with respect to the notch frame. The notched bar may extend at least partially between the front notch frame member and the rear notch frame member. The notched bar may include a first end, a second end, a length extending between the first and second ends, and a multiple notches disposed along the length of the notched bar. The multiple notches may be configured to removably receive the latch paddle. The latch paddle may be gravitationally biased into removable engagement with the plurality of notches as the latch frame slides along the notch frame.

Another example embodiment includes a method of providing a slidable conveying assembly. The slidable conveying assembly may include a latch frame, a latch rod, a notch frame, a notched bar, and a biasing mechanism. The latch frame may be configured to slidably engage with a notch frame and may include a cargo deck disposed thereon. The latch rod may be rotatably engaged with the latch frame and may include a latch paddle at a first end and a latch handle at a second end. The notched bar may extend at least partially through the notch frame and may include a first end, a second end, a length extending between the first and second ends, and a multiple notches disposed along the length of the notched bar. The multiple notches may be configured to removably receive the latch paddle. The biasing mechanism may be operably coupled to the latch frame and the latch rod and may be configured to bias the latch paddle into the multiple notches such that the latch paddle is biased into removable engagement with the multiple notches as the latch frame slides along the notch frame. The method may further include applying a rotational force to the latch handle to release the latch paddle from its engagement with one of the plurality of notches and extending or retracting the latch frame from the cargo bed to a desired distance. The method may also include releasing the rotational force to allow the biasing mechanism to bias the latch paddle into another of the plurality of notches.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

It is to be understood that both the foregoing general description and the following detailed description are exemplary and explanatory and are not restrictive of the invention, as claimed.

BRIEF DESCRIPTION OF THE DRAWINGS

To further clarify the above and other advantages and features of the described embodiments, a more particular description of the embodiments will be rendered by reference to specific embodiments thereof which are illustrated in the appended drawings. It is appreciated that these drawings depict only example embodiments and are therefore not to be considered limiting of its scope. Example embodiments will be described and explained with additional specificity and detail through the use of the accompanying drawings in which.

DETAILED DESCRIPTION

Particular embodiments of the present disclosure will be described with reference to the accompanying drawings. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of configurations, all of which are explicitly contemplated herein. In the figures and in the following description, the term "front" will refer to the end of a vehicle or space that is furthest from an operator or user during use of the device or assembly; the terms "rear" or "back" will refer to the end of the vehicle or space that is closest to the operator or user during use of the device or assembly; the term "left" will refer to the operator's or user's left-hand side when facing the device or assembly; and the term "right" will refer to the operator's or user's right-hand side when facing the device or assembly.

Some cargo deck conveying assemblies may be limited in the number of positions at which the cargo deck may be securely extended from a truck bed. For example, a typical assembly may include stopping or locking mechanisms to define the fully-extended and fully-retracted positions of the cargo deck relative to the truck bed. In these designs, the cargo deck cannot be securely held in any intermediate positions between the fully-extended and fully-retracted positions of the cargo deck. The lack of defined, securable positions along the path of the deck may be inconvenient or even unsafe for a user, because the deck may be caused to transition unintentionally as articles are loaded onto or removed from the deck. This problem may be further exacerbated where the assembly is being used in sub-optimal conditions, such as in cramped spaces or on a sloped or uneven road surface.

In some embodiments, an example cargo deck conveying assembly is described that includes a stopping or latching mechanism that may include one or more securable positions along the path of the cargo deck besides the fully-extended and fully-retracted positions of the cargo deck.

Embodiments of the present disclosure will now be explained with reference to the accompanying figures.

Figure 1A:
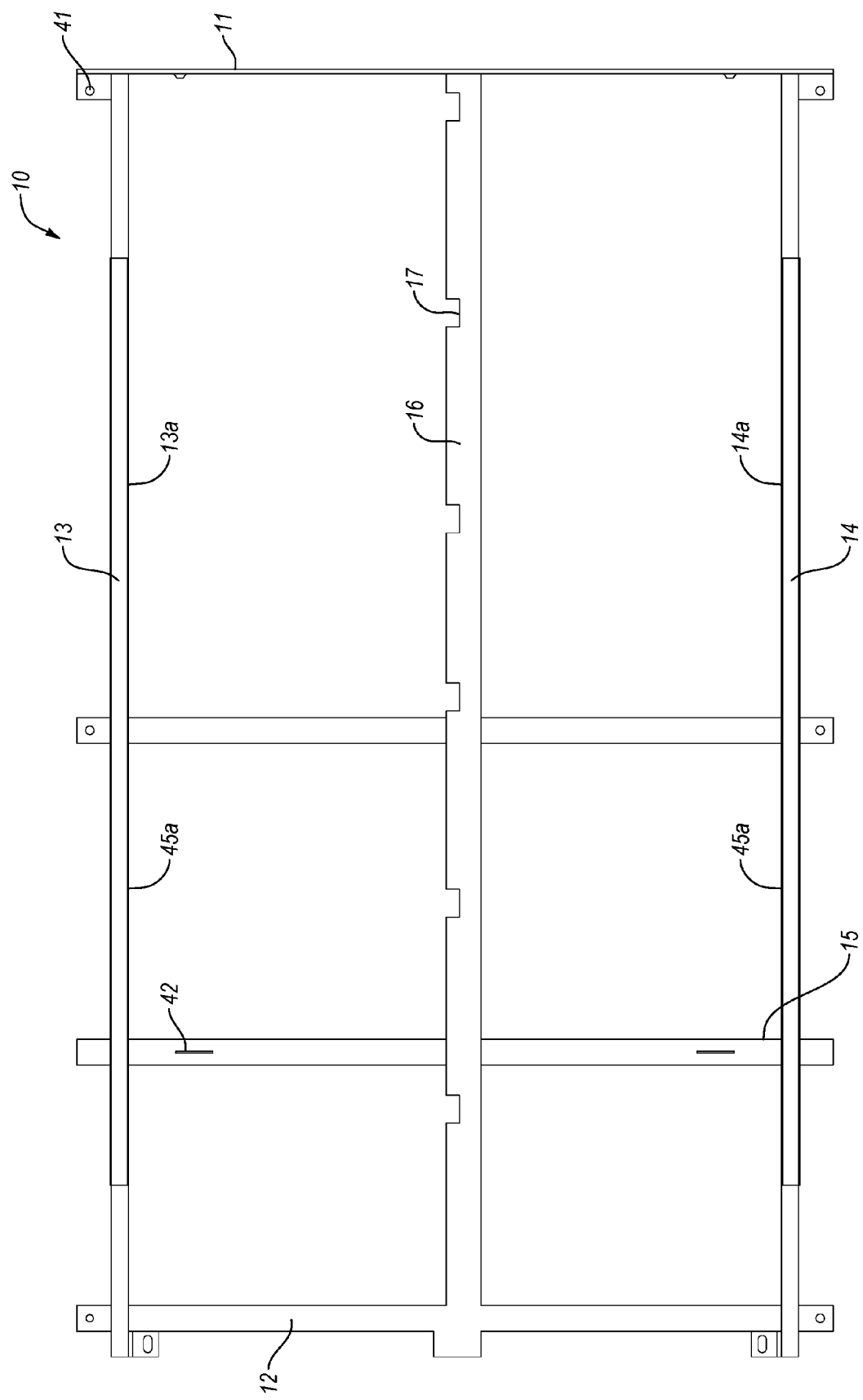
FIG. 1A illustrates a top view of a notch frame.

FIG. 1A illustrates a top view of a notch frame 10, arranged in accordance with at least one embodiment described herein. The notch frame 10 may form part of an example cargo deck conveying assembly, such as the example cargo deck conveying assemblies of FIGS. 2A, 2B, 3A, and 3B. The notch frame 10 may include a front notch frame member 11, a rear notch frame member 12, a first notch side rail 13, and a second notch side rail 14. In some embodiments, the notch frame 10 may further include one or more cross bars 15 extending between the first and second notch side rails 13, 14 to provide additional structural support.

The first and second notch side rails 13, 14 may define, respectively, a first inward notch side 13a and a second inward notch side 14a. The first and second inward notch sides 13a, 14a may each include a channel 45a extending in a lengthwise direction. Mounting brackets 41 may be disposed along the notch frame 10, such as at the ends of the front and rear notch frame members 11, 12 and the cross bars 15. The mounting brackets 41 may provide points at which the notch frame 10 may be secured to a vehicle. For example, the notch frame 10 may be secured to a bed of a truck. Alternately or additionally, the notch frame 10 may be secured to a cargo space inside of a vehicle. For example, the notch frame 10 may be secured within a cargo space of a van or sport utility vehicle. Alternately or additionally, the notch frame 10 may be used and secured inside of a storage space. For example, the notch frame may be mounted inside a freezer, closet, or other storage space. In some embodiments, the mounting brackets 41 may include holes or threaded holes to receive screws or other fasteners for mounting the notch frame 10.

Catch brackets 42 may be disposed along and extend away from the cross bar 15 to prevent overextension of the extension or latch frames 20, 30 from the assembly 100 (described in further detail below). Alternately or additionally, the catch brackets 42 may be disposed along and extend away from the rear notch frame member 12.

A notched bar 16 may extend at least partially between the front notch frame member 11 and the rear notch frame member 12. For example, as illustrated, the notched bar 16 may extend between the front notch frame member 11 and the rear notch frame member 12. Alternately or additionally, the notched bar 16 may extend between either of the front notch frame member 11 and the rear notch frame member 12 and a cross bar 15. Alternately or additionally, the notched bar 16 may extend between one or more cross bars 15 and may not contact either of the front notch frame member 11 or the rear notch frame member 12. Furthermore, the notched bar 16 may extend beyond the front and/or rear notch frame members 11, 12. The notched bar 16 is illustrated as positioned approximately halfway between the first or second notch side rails 13, 14. In some embodiments, the notched bar 16 may be positioned closer to the first or second notch side rails 13, 14.

The notched bar 16 may include multiple notches 17 disposed along its length. The notches 17 may be evenly-spaced along the bar 16. Alternately or additionally, the notches 17 may be strategically-spaced to define significant job-specific points, randomly spaced, or spaced accordingly to some other criteria. The notches 17 may be disposed along the length of the notched bar 16 on the same side of the notched bar 16. Furthermore, the notches 17 may be disposed such that the openings of the notches 17 face the first or second notch side rails 13, 14. In particular, the openings of the notches 17 may face the first inward notch side 13*a* or the second inward notch side 14*a*.

Figure 1B:
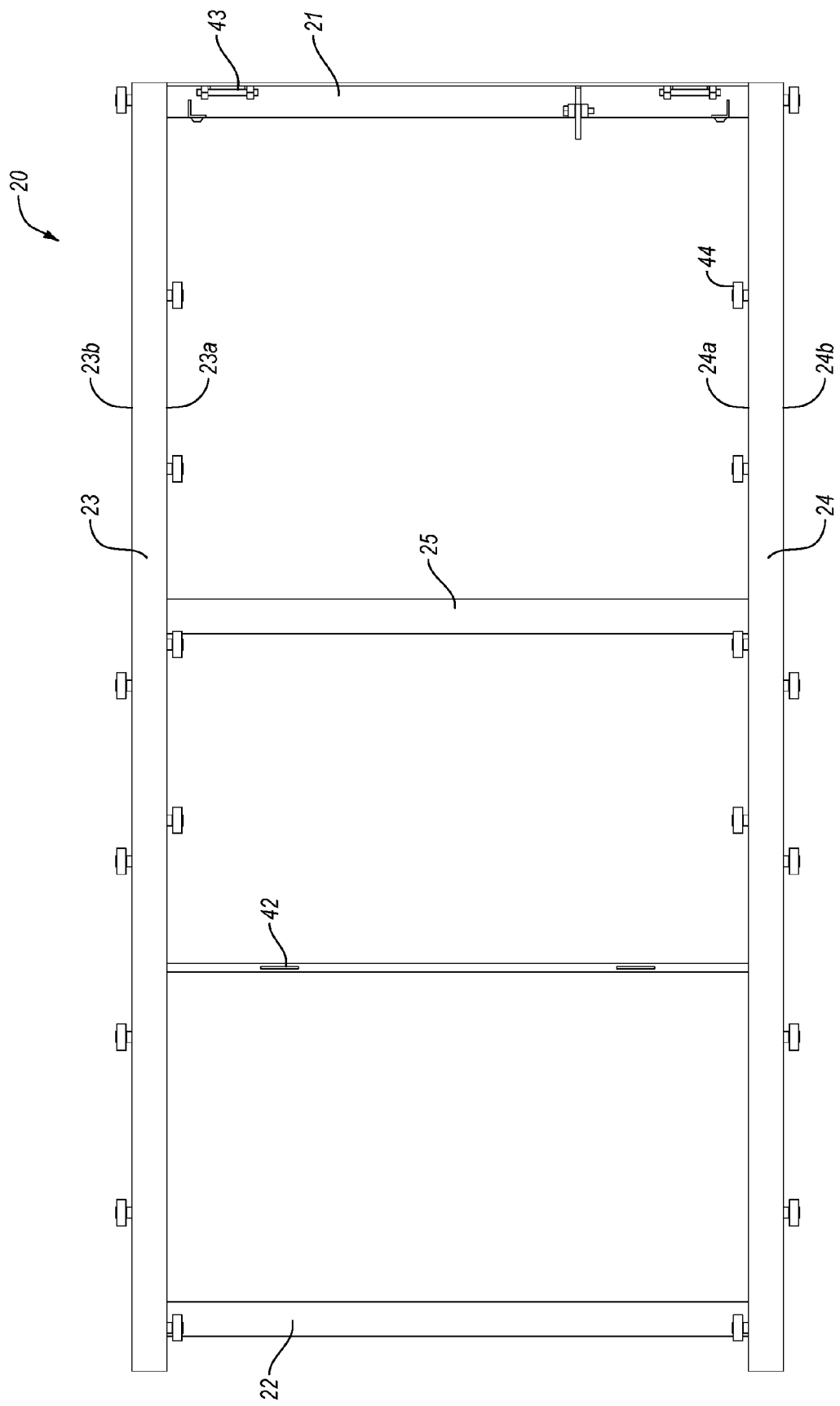
FIG. 1B illustrates a top view of an extension frame.

FIG. 1B illustrates a top view of an extension frame 20, arranged in accordance with at least one embodiment described herein. The extension frame 20 may form part of an example cargo deck conveying assembly, such as the example cargo deck conveying assemblies of FIGS. 2A and 2B. The extension frame 20 may include a front extension frame member 21, a rear extension frame member 22, a first extension side rail 23, and a second extension side rail 24. In some embodiments, the extension frame 20 may further include one or more cross bars 25 extending between the first and second notch side rails 23, 24 to provide additional structural support. The first and second extension side rails 23, 24 may define, respectively, a first inward extension side 23*a* and first outward extension side 23*b*, and a second inward extension side 24*a* and second outward extension side 24*b*. The first and second inward and outward extension sides 23*a*, 23*b*, 24*a*, 24*b* may each include multiple bearings 44 operably coupled thereon. Stop brackets 43 may be disposed along the front extension frame member 21 or a cross bar 25. Catch brackets 42 may be disposed along the rear extension frame member 22 or a cross bar 25. The stop and catch brackets 43 and 42 may help to prevent overextension of the extension or latch frames 20, 30 from the assembly 100, as described in further detail below.

Figure 1C:
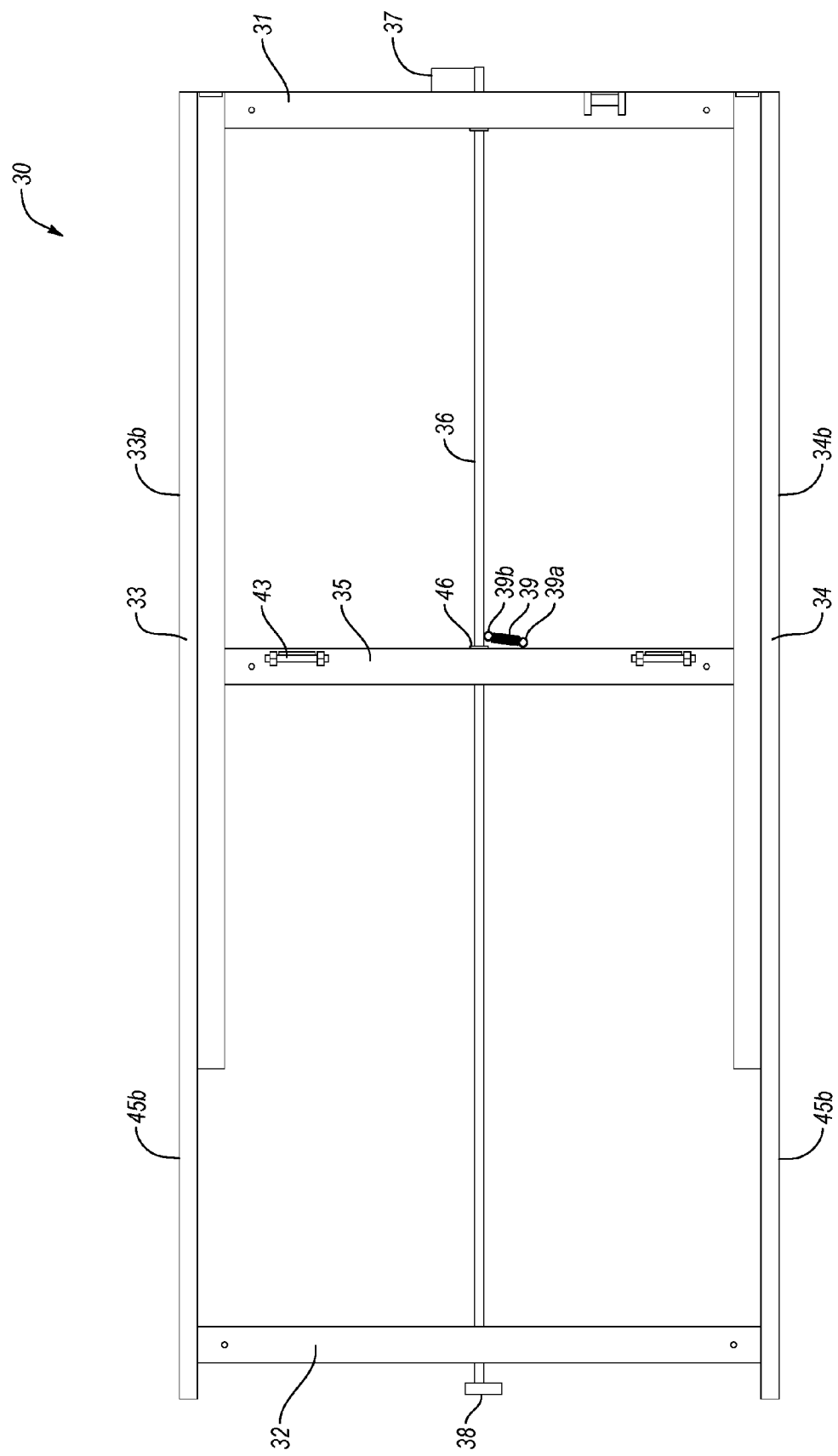
FIG. 1C illustrates a top view of a latch frame.

FIG. 1C illustrates a top view of a latch frame 30, arranged in accordance with at least one embodiment described herein. The latch frame 30 may form part of an example cargo deck conveying assembly, such as the example cargo deck conveying assemblies of FIGS. 2A, 2B, 3A, and 3B. The latch frame 30 may include a front latch frame member 31, a rear latch frame member 32, a first latch side rail 33, and a second latch side rail 34. In some embodiments, the latch frame 30 may further include one or more cross bars 35 extending between the first and second latch side rails 33, 34 to provide additional structural support. The first and second latch side rails 33, 34 may define, respectively, a first outward latch side 33*b* and a second outward latch side 34*b*. The first and second outward latch sides 33*b*, 34*b* may each include a channel 45*b* extending in a lengthwise direction. Stop brackets 43 may be disposed along the rear latch frame member 32 or a cross bar 35 to help to prevent overextension of the latch frame 30 from the assembly 100 as described in further detail below. The latch frame 30 may be configured to fixedly or removably support a cargo deck or other support or storage apparatus.

A latch rod 36 may be rotatably engaged with, and extend at least partially between, the front latch frame member 31 and the rear latch frame member 32. The latch rod 36 may further include a latch paddle 37 at a first end and a latch handle 38 at a second end. The shape of the latch paddle 37 may correspond to the shape of the multiple notches 17 such that the latch paddle 37 may engage securely into the notches 17. Once the latch paddle 37 is engaged with a notch 17, the secure engagement may prevent the latch frame 30 from substantial longitudinal movement toward the front or back of the vehicle or space. In some embodiments, the latch paddle 37 may be rectangular in shape and the multiple notches 17 may correspondingly be rectangular as well. Multiple washers 46 may be disposed along the latch rod 36 to help to prevent longitudinal movement of the latch rod 36 along the direction of the first latch side rail 33 and the second latch side rail 34. In these and other embodiments, the washers 46 may help to prevent longitudinal movement of the latch rod 36 toward the front or back of the vehicle or space to which the latch frame 30 is coupled through the notch frame 10. As illustrated, the latch rod 36 extends between the front latch frame member 31 and the rear latch frame member 32. In some embodiments, the latch rod 36 may extend between the rear latch frame member 32 and one of the cross bars 35.

A biasing mechanism 39 may include a first end 39*a* and a second end 39*b*. The first end 39*a* may be operably coupled to a portion of the latch frame 30, such as at a cross bar 35. The second end 39*b* may be operably coupled to the latch rod 36. In some embodiments, the biasing mechanism 39 may be a tension coil spring. The biasing mechanism 39 may be configured to provide a biasing force onto the latch rod 36 such that the latch paddle 37 may be biased into engagement with the multiple notches 17. In some embodiments, the biasing force may be a tensioning or a torsioning force, or a combination of the two.

Figure 1D:
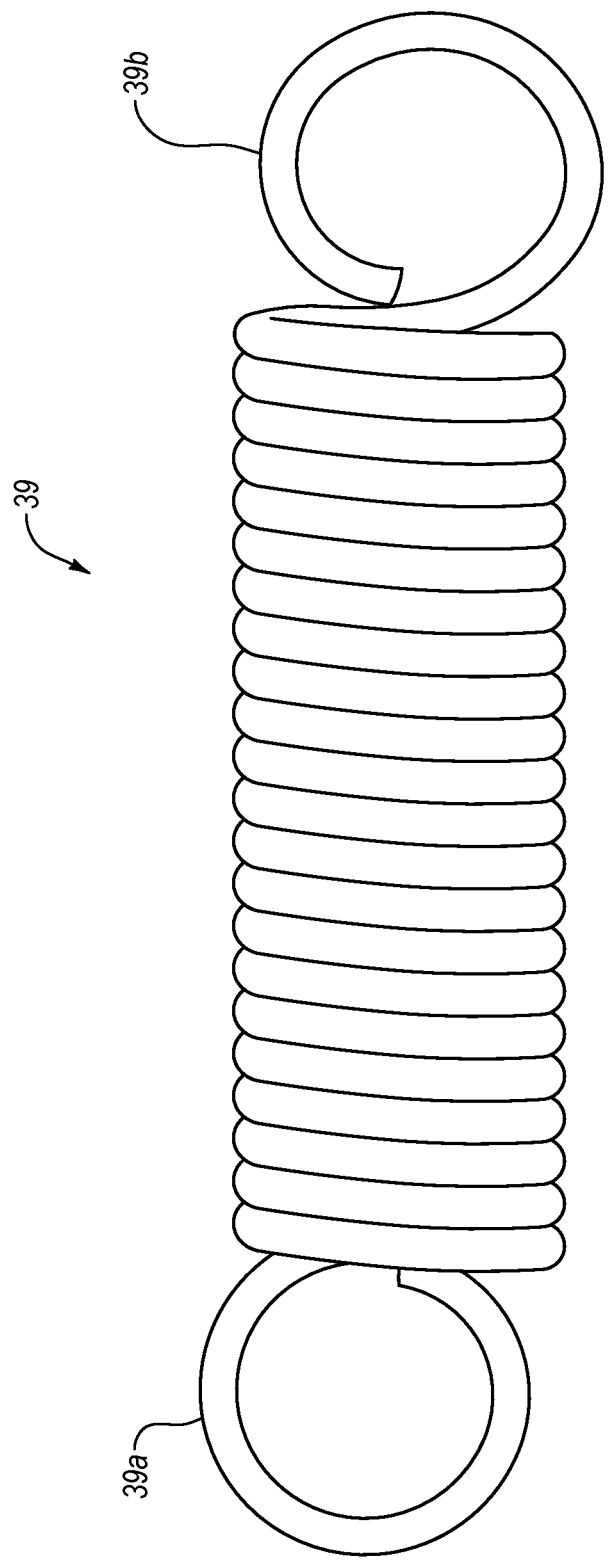
FIG. 1D illustrates a side view of a biasing mechanism.

For example, FIG. 1D illustrates a side view of the biasing mechanism 39 as a tension coil spring, arranged in accordance with at least one embodiment described herein. In these and other embodiments, the tension coil spring 39 may have a length of 2.25 inches and a diameter of 0.5 inches. In other embodiments, the tension coil spring 39 may have other dimensions. For example, the tension coil spring 39 may be shorter or longer than 2.25 inches depending on a location to which the tension coil spring 39 is coupled to the latch frame 30. The tension coil spring 39 may also be capable of applying a steady force of approximately 10 pounds of force (lbf). The approximately 10 lbf may be a sufficient biasing force to keep the latch paddle 37 securely biased into the notches 17, but also a sufficiently low biasing force that an average operator or user may easily overcome the biasing force when the latch paddle 37 is to be disengaged from a notch 17. Alternately or additionally, the tension coil spring 39 may be capable of applying a steady force that is less than or greater than 10 lbf. For example, depending on the weight of the latch paddle 37 or the strength of the anticipated operator or user, the biasing force of the biasing mechanism 39 may be adjusted accordingly.

The notch, extension, and latch frames 10, 20, 30, as well as the notched bar 16 and latch rod 36, may be formed by any type of substantially rigid material. In some embodiments, the notch, extension, and latch frames 10, 20, 30 may be formed from steel or some other metal. In these and other embodiments, the notched bar 16 and latch rod 36 may also be formed from steel or some other metal. The front, rear, side, and cross members of the notch, extension, and latch frames 10, 20, 30, respectively, may be permanently coupled to one another, such as by welding.

Modifications, additions, or omissions may be made to the components of the assembly 100 illustrated in FIGS. 1A-1D without departing from the scope of the present disclosure. For example, the notch, extension, and/or latch frames 10, 20, 30 may not include the cross bars 15, 25, 35 or may include fewer or more cross bars 15, 25, 35 than those illustrated. Alternately or additionally, in some embodiments, the notch, extension, and/or latch frames 10, 20, 30 may not include their respective rear frame members 12, 22, 32. In other embodiments, the bearings 44 may be operably coupled to the first and second inward notch sides 13*a*, 14*a* and the first and second outward latch sides 33*b*, 34*b* to slidably engage with channels extending lengthwise on the first and second inward and outward extension sides 23*a*, 23*b*, 24*a*, 24*b* of the extension frame 20. In still other embodiments, the notch, extension, and/or latch frames 10, 20, 30 may employ mechanisms other than the bearings 44 and the channels 45a, 45b to achieve a slidable engagement between the frames 10, 20, 30. In these and other embodiments, the notch, extension, and latch frames 10, 20, 30 may be assembled by bindings, adhesives, or fasteners such as bolts or screws.

In these and other embodiments, the shapes and sizes of the multiple notches 17 and the corresponding shape and size of the latch paddle 37 may vary. Furthermore, the biasing mechanism 39 may be any tensioning or torsioning mechanism capable of biasing the latch paddle 37 into the multiple notches 17, including springs of varying sizes, strengths, and construction. The biasing mechanism 39 may also be operably coupled to the latch rod 36 and latch frame 30 to provide tension from the left or right side or torsion in the clockwise or counterclockwise directions. In still other embodiments, a biasing mechanism 39 may not be necessary at all, as the latch paddle 37 may be naturally inclined toward engagement with the multiple notches 17 (e.g., gravitational or magnetic pull on the latch paddle 37).

Figure 2A:
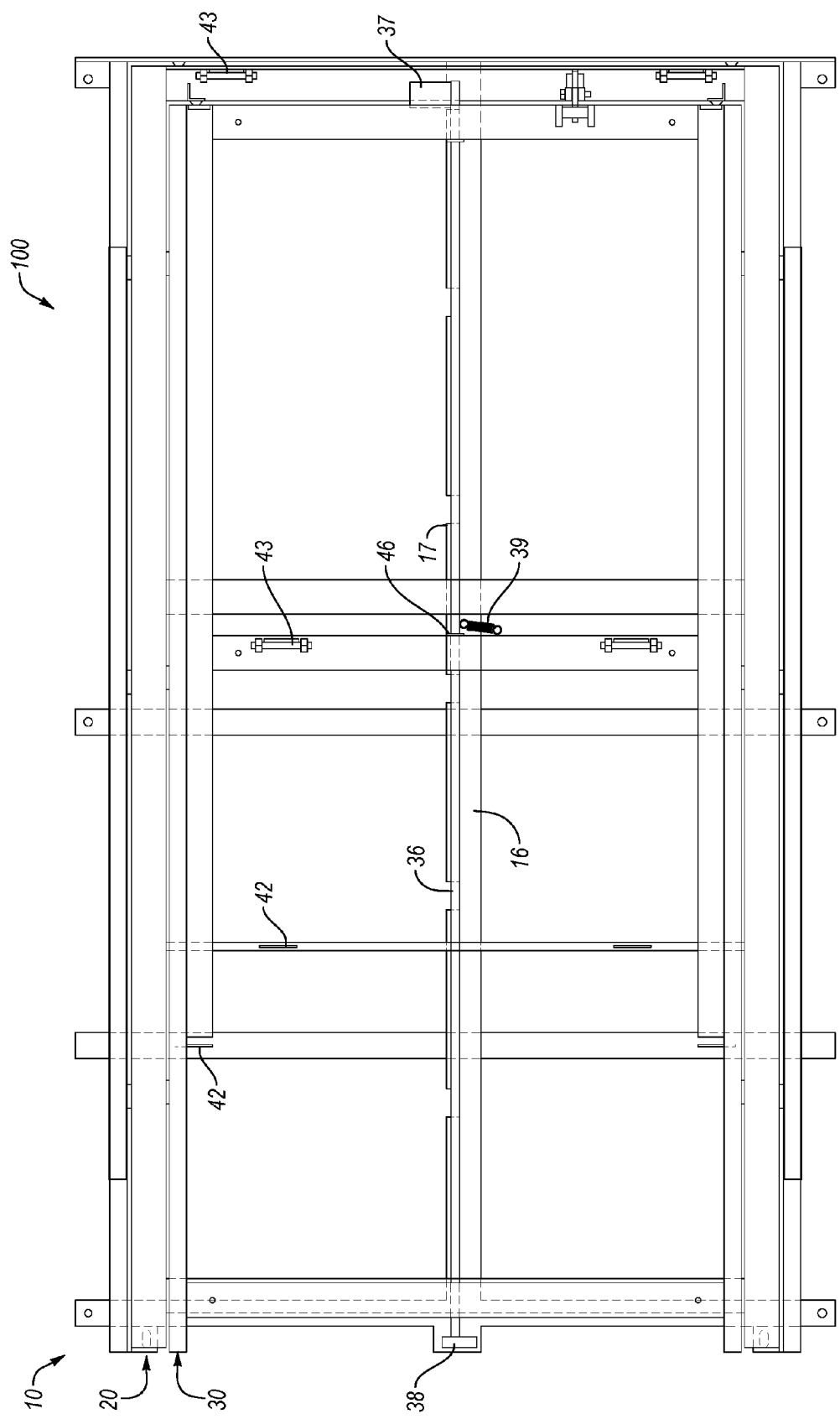
FIG. 2A illustrates a top view of a conveying assembly including a latch frame, extension frame, and notch frame in a retracted state.
Figure 2B:
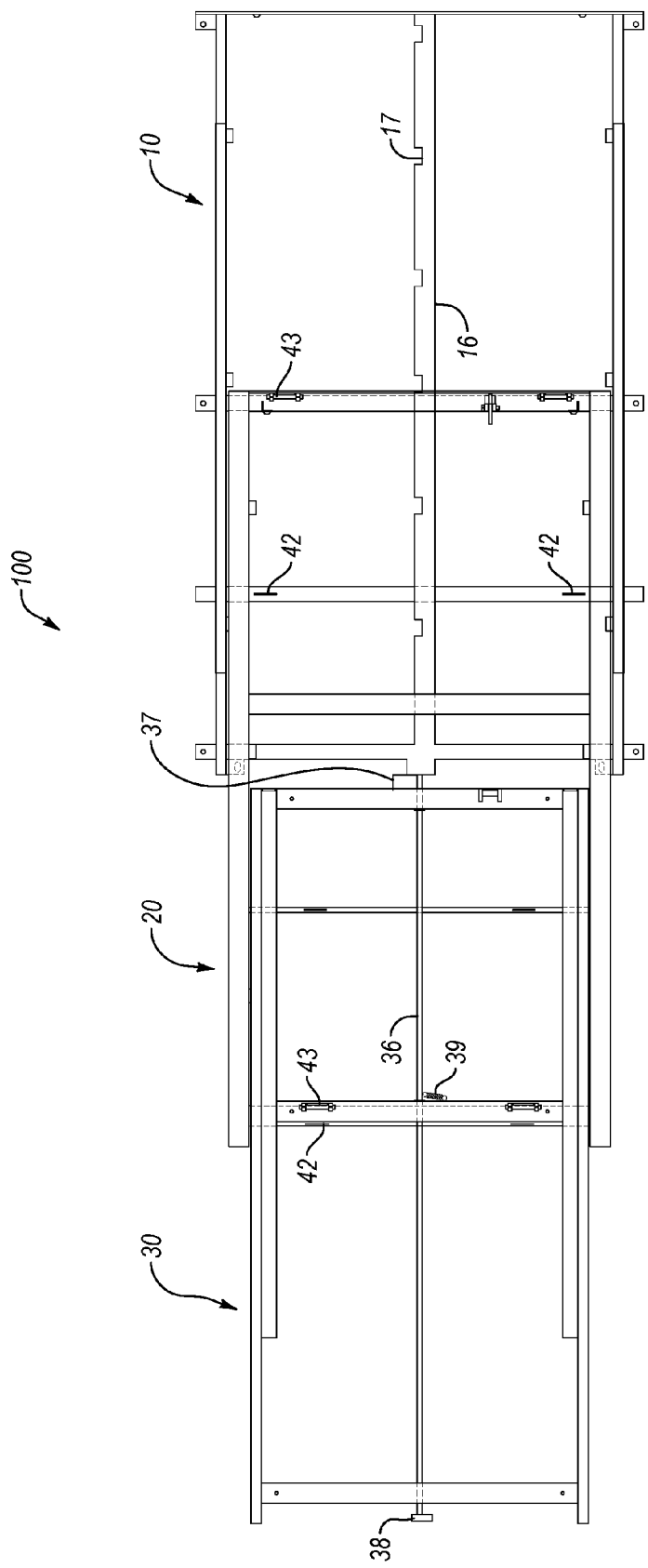
FIG. 2B illustrates a top view of the conveying assembly of FIG. 2A in an extended state.

FIGS. 2A and 2B illustrate an example conveying assembly 100 in an assembled state, arranged in accordance with at least one embodiment described herein. In the assembled state, the notch frame 10 may be fixedly coupled to a truck bed or other vehicle cargo space, or a storage space (not shown), such as by the mounting brackets 41 disposed thereon. The channels 45a of the first and second inward notch sides 13a, 14a of the notch frame 10 may be engaged with the bearings 44 of, respectively, the first and second outward extension sides 23b, 24b of the extension frame 20 such that the channels 45a roll along the bearings 44 and the extension frame 20 slides with respect to the notch frame 10 when a force is exerted thereon in the front or back direction. Correspondingly, the bearings 44 of the first and second inward extension sides 23a, 24a of the extension frame 20 may be engaged within the channels 45b of, respectively, the first and second outward latch sides 33b, 34b of the latch frame 30 such that the channels 45b roll along the bearings 44 and the latch frame 30 slides with respect to the extension frame 20 when a force is exerted thereon in the front or back direction. Accordingly, the first and second extension frame side rails 23, 24 may be slidably engaged with the first and second notch frame side rails 13, 14, respectively, and the first and second latch frame side rails 33, 34 may be slidably engaged with the first and second extension frame side rails 23, 24. As a result, the latch frame 30 may slide with respect to the notch frame 10 and the extension frame 20.

In the assembled state, the catch brackets 42 disposed along the rear notch frame member 12 or cross bar 15 may align with the stop brackets 43 disposed along the front extension frame member 21 or cross bar 25 such that the stop brackets 43 may contact the catch brackets 42 as the extension frame 20 is slid back from the notch frame 10. Alternately or additionally, the catch brackets 42 disposed along the rear extension frame member 22 or cross bar 25 may align with the stop brackets 43 disposed along the front latch frame member 31 or cross bar 35 such that the stop brackets 43 may contact the catch brackets 42 as the latch frame 30 is slid back from the notch and/or extension frames 10, 20. Accordingly, as the extension and/or latch frames 20, 30 are slid back from the truck bed, vehicle cargo space, or other storage space, the extension and/or latch frames 20, 30 may be prevented from extending beyond a maximum point defined by the catch brackets 42. The extension and/or latch frames 20, 30 being prevented from extending beyond a maximum point defined by the catch brackets 42 may help to protect the assembly 100 from excessive stress or accidental disassembly.

In some embodiments, the catch brackets 42 and the stop brackets 43 may pivot between operable and inoperable positions to facilitate disassembly of the assembly 100 when necessary. In other embodiments, the rear frame members 12, 22 and/or specific cross bars 15, 25 may be disposed at a sufficient height, or the stop brackets 43 may be a sufficient length, for the rear frame members 12, 22 and/or cross bars 15, 25 to function as catch brackets 42. Accordingly, as opposed to contacting the catch brackets 42 of the notch and/or extension frames 10, 20, the stop brackets 43 of the extension and/or latch frames 20, 30 may contact the rear frame members 12, 22 or cross bars 15, 25 as the frames 20, 30 are slid back. Conversely, the front frame members 21, 31 and/or specific cross bars 25, 35 may be disposed at a sufficient height, or the catch brackets 42 may be a sufficient length, for the front frame members 21, 31 and/or cross bars 25, 35 to function as stop brackets 43. Accordingly, as opposed to contacting the stop brackets 43 of the extension and/or latch frames 20, 30, the catch brackets 42 of the notch and/or extension frames 10, 20 may contact the front frame members 21, 31 or cross bars 25, 35 as the frames 20, 30 are slid back.

The notched bar 16 and the latch rod 36 may extend in proximal alignment with one another in a manner such that the tension coil spring 39 biases the latch paddle 37 into removable engagement with the plurality of notches 17 as the latch frame 30 slides with respect to the notch and/or extension frames 10, 20.

Figure 2C:
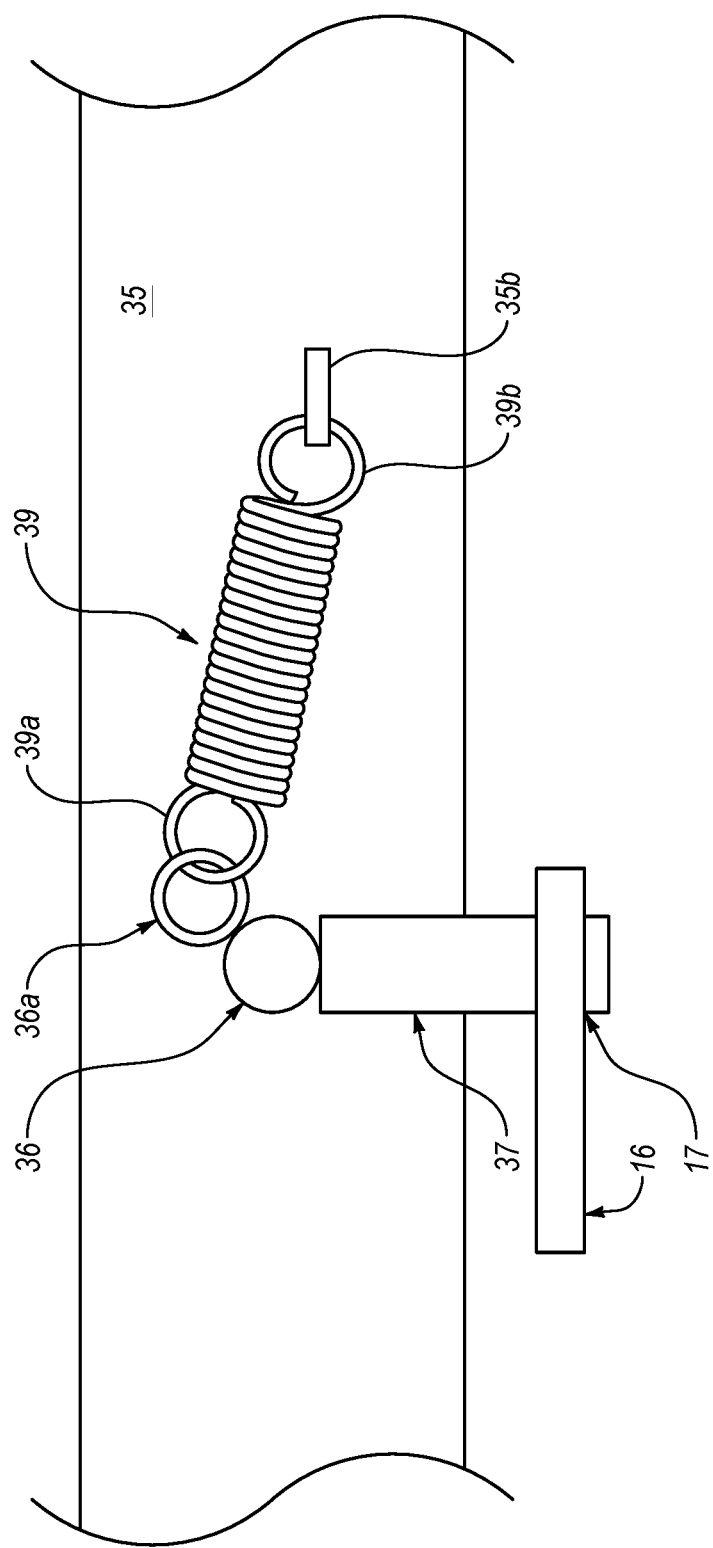
FIG. 2C illustrates a schematic view of the biasing mechanism operating on the conveying assembly of FIG. 2A.

FIG. 2C illustrates a schematic view of the biasing mechanism operating on the conveying assembly of FIG. 2A, arranged in accordance with at least one embodiment described herein. The tension coil spring 39 may be operably coupled at its first end 39a to a latch attachment point 36a disposed along the latch rod 36. The tension coil spring 39 may be operably coupled at its second end 39b to a cross attachment point 35b disposed along the cross bar 35 such that an angle θ between the length of the spring 39 and the cross bar 35 is between approximately 30 and 60 degrees. The cross attachment point 35b may be disposed along a central portion of the cross bar 35, proximal to the notched bar 16 and latch rod 36. The angle θ at which the tension coil spring 39 operates on the latch rod 36 may provide a steady torsional force in the clockwise direction, thereby causing the latch paddle 37 to bias into the plurality of notches 17.

When the latch paddle 37 is engaged with one of the plurality of notches 17, the latch frame 30 may be prevented from sliding along the notch or extension frames 10, 20 until a force sufficient to overcome the tension coil spring 39 is applied to disengage the latch paddle 37 from the notch 17. When the latch paddle 37 is not engaged with the plurality of notches 17, the latch frame 30 may slide freely along the notch or extension frames 10, 20 until the latch paddle 37 reaches a notch 17, in which case, in the absence of a sufficient overcoming force, the latch paddle 37 may be biased into engagement with the notch 17. Accordingly, the latch paddle 37 may bypass a plurality of notches 17 by maintaining the force sufficient to overcome the spring 39 as the latch frame 30 is slid along the notch 17 and/or extension frames 10, 20.

Modifications, additions, or omissions may be made to the assembly 100 without departing from the scope of the present disclosure. For example, the extension frame 20 may be omitted from the assembly 100. Alternately or additionally, the location and/or number of the bearings 44 may be different than the location and number illustrated.

Figure 3A:
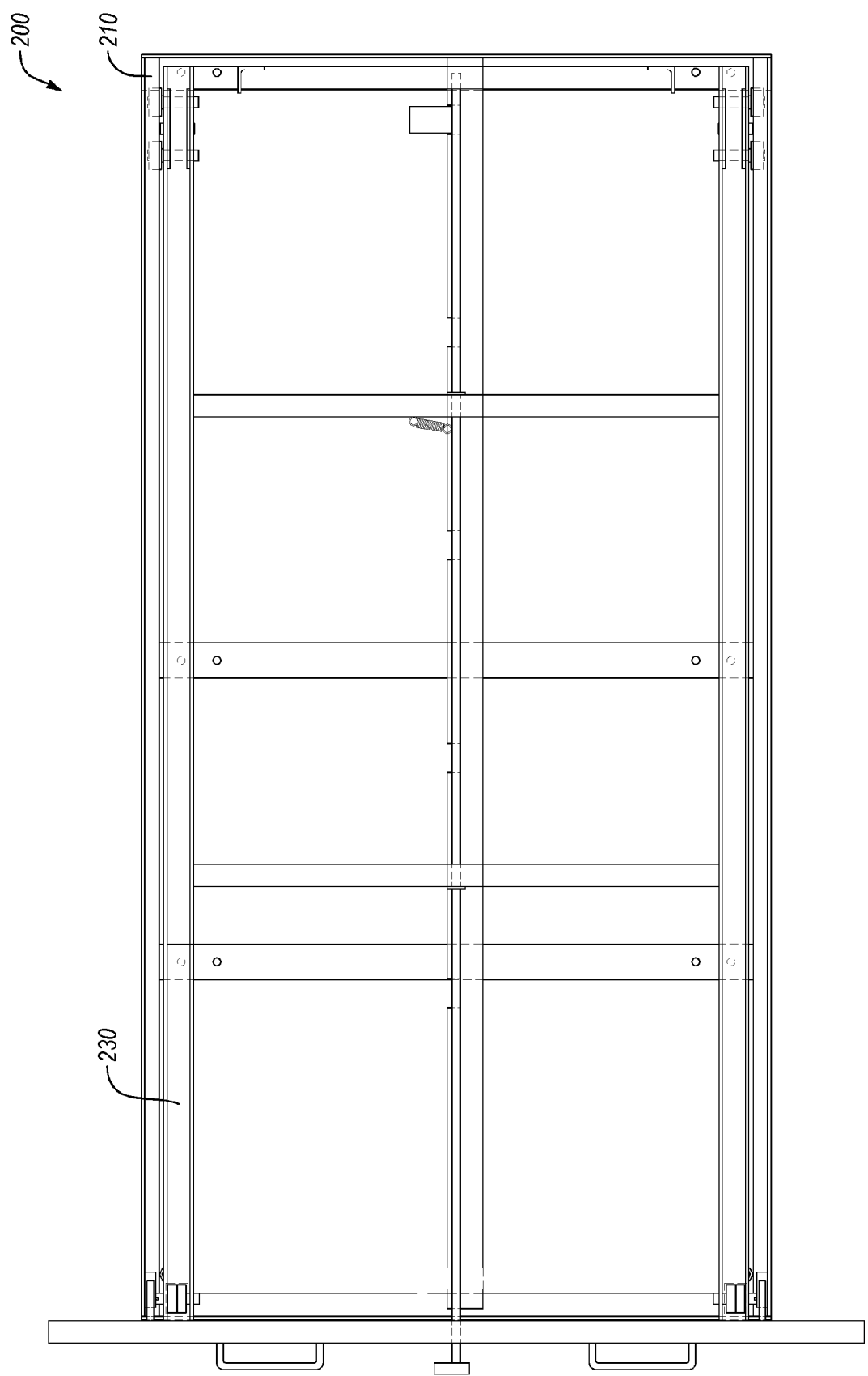
FIG. 3A illustrates a top view of another conveying assembly including a latch frame and a notch frame in a retracted state.
Figure 3B:
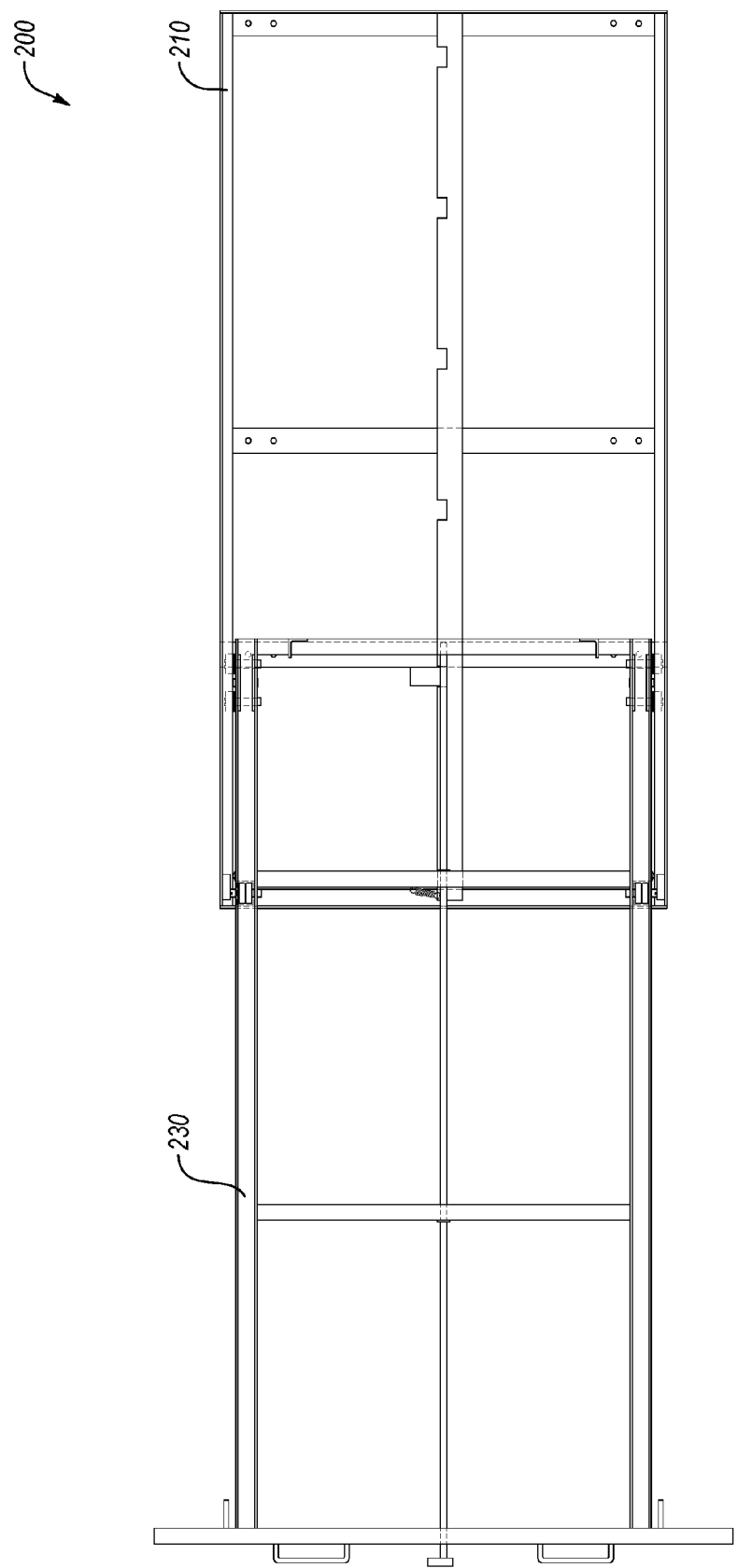
FIG. 3B illustrates a top view of the conveying assembly of FIG. 3A in an extended state.

FIGS. 3A and 3B illustrate another example conveying assembly 200 ("the assembly 200"), arranged in accordance with at least one embodiment described herein. The assembly 200 includes a notch frame 210 and a latch frame 230 and is analogous in operation to the assembly 100 of FIGS. 2A and 2B except that the assembly 200 does not include an intermediate frame, such as the extension frame 20 of assembly 100 (FIGS. 2A and 2B). As a result, the latch frame 230 may be slidably engaged directly with the notch frame 210 and secured in multiple locations along the slidable engagement with the notch frame 210.

In an example method of use of a conveying assembly, such as the assemblies 100 and/or 200 of FIGS. 2A, 2B, 3A, and 3B, a rotational force, sufficient to overcome the biasing force produced by a biasing mechanism, such as the biasing mechanism 39 of FIGS. 1C, 1D, 2A, 2B, and 2C, may be applied to a latch handle, such as the latch handle 38 of FIGS. 1C, 2A, and 2B. Overcoming the biasing force of the biasing mechanism may allow a latch paddle, such as the latch paddle 37 of FIGS. 1C, 2A, and 2B, to disengage from one of multiple notches on a notch frame, such as the notch frame 10 and/or 210 of FIGS. 1A, 2A, 2B, 3A, and 3B. As a result, a latch frame, such as the latch frame 30 and/or 230 of FIGS. 1C, 2A, 2B, 3A, and 3B may be extended or retracted from a truck bed, a vehicle cargo space, or other storage space to a desired distance or securement point along the notch frame. The latch paddle may be reengaged with one of the multiple notches either by releasing the rotational force after the desired distance is achieved, or releasing the rotational force as soon as the latch paddle is disengaged and moved away from a notch. In some embodiments, the rotational force may be a clockwise rotational force. In other embodiments, the rotational force may be counterclockwise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
   a latch frame including a front latch frame member, a rear latch frame member, a first latch side rail, and a second latch side rail;
   a latch rod rotatably engaged with, and at least partially extending between the front latch frame member and the rear latch frame member, and including a latch paddle at a first end;
   a notch frame including a front notch frame member, a rear notch frame member, a first notch side rail, and a second notch side rail, the first and second latch side rails configured to slidably engage with the first and second notch side rails, respectively, such that the latch frame slides with respect to the notch frame; and
   a notched bar extending at least partially between the front notch frame member and the rear notch frame member, and including a first end, a second end, a length extending between the first and second ends, and a plurality of notches disposed along the length of the notched bar, the plurality of notches configured to removably receive the latch paddle,
   wherein the latch paddle is gravitationally biased into removable engagement with the plurality of notches as the latch frame slides along the notch frame.

2. The system of claim 1, wherein the plurality of notches are disposed in evenly-spaced distances along the length of the notched bar.

3. The system of claim 1, wherein the plurality of notches include at least a first notch proximate the first end of the notched bar and a second notch proximate the second end of the notched bar.

4. The system of claim 1, further comprising a cargo deck disposed on the latch frame.

5. The system of claim 1, wherein:
   the latch frame further comprises a stop bracket on the front latch frame member;
   the notch frame further comprises a catch bracket on the rear latch frame member; and
   the stop bracket and catch bracket contact one another as the latch frame slides along the notch frame.

6. The system of claim 1, further comprising an extension frame including a front extension frame member, a rear extension frame member, a first extension side rail, and a second extension side rail,
   wherein the first and second extension side rails are configured to slidably engage with the first and second notch side rails, and
   wherein the first and second latch side rails are configured to slidably engage with the first and second extension side rails.

7. The system of claim 6, wherein:
   the latch frame further comprises a stop bracket on the front latch frame member;
   the extension frame further comprises a stop bracket on the front extension frame member and a catch bracket on the rear extension frame member; and
   the notch frame further comprises a catch bracket on the rear notch frame member,
   wherein the stop bracket of the front latch frame member and the catch bracket on the rear extension frame member contact one another as the latch frame slides along the extension frame and the stop bracket of the extension frame and the catch bracket on the notch frame contact one another as the extension frame slides along the notch frame.

8. The system of claim 1, wherein the latch rod further comprising washers to restrict the latch rod to rotational movement within the latch frame.

9. A method, comprising the steps of:
   providing a slidable conveying assembly comprising:
      a latch frame configured to slidably engage with a notch frame, and including a cargo deck disposed thereon,
      a latch rod rotatably engaged with the latch frame and including a latch paddle at a first end and a latch handle at a second end;
      a notched bar extending at least partially through the notch frame, and including a first end, a second end, a length extending between the first and second ends, and a plurality of notches disposed along the length of the notched bar, the plurality of notches configured to removably receive the latch paddle; and
      a biasing mechanism operably coupled to the latch frame and the latch rod and configured to bias the latch paddle into the plurality of notches such that the latch paddle is biased into removable engagement with the plurality of notches as the latch frame slides along the notch frame;
   applying a rotational force to the latch handle to release the latch paddle from its engagement with one of the plurality of notches;
   extending or retracting the latch frame from a cargo bed to a desired distance; and releasing the rotational force to allow the biasing mechanism to bias the latch paddle into another of the plurality of notches.

10. The method of claim 9, wherein the releasing the rotational force is performed after the desired distance of the latch frame from the cargo bed is reached.

11. The method of claim 9, wherein the releasing the rotational force is performed while extending or retracting the latch frame from the cargo bed to the desired distance.

12. The method of claim 9, wherein the rotational force is a clockwise rotational force.

13. The method of claim 9, wherein the rotational force is a counterclockwise rotational force.

* * * * *